(12) United States Patent
Pursifull

(10) Patent No.: US 9,488,117 B2
(45) Date of Patent: Nov. 8, 2016

(54) METHOD AND SYSTEM FOR PROVIDING VACUUM FOR A VEHICLE

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 621 days.

(21) Appl. No.: 13/856,259

(22) Filed: Apr. 3, 2013

(65) Prior Publication Data

US 2014/0303872 A1   Oct. 9, 2014

(51) Int. Cl.
*F02D 31/00* (2006.01)
*F02D 37/02* (2006.01)
*F02D 41/00* (2006.01)

(52) U.S. Cl.
CPC ..... *F02D 31/001* (2013.01); *B60W 2710/0683* (2013.01); *F02D 37/02* (2013.01); *F02D 2041/001* (2013.01); *F02D 2200/101* (2013.01); *F02D 2250/18* (2013.01); *F02D 2250/24* (2013.01); *F02D 2250/41* (2013.01); *F02D 2400/12* (2013.01)

(58) Field of Classification Search
CPC ............. F02D 9/00; F02D 2700/0235; F02D 31/005; F02D 41/083; F02D 31/003; F02D 2250/18; F02D 2041/1415; F02D 41/1401; F02D 2011/102; F01L 1/12; F01L 1/08
See application file for complete search history.

(56) References Cited

U.S. PATENT DOCUMENTS

| | | | |
|---|---|---|---|
| 6,866,020 B2 | 3/2005 | Allston et al. | |
| 6,920,387 B2* | 7/2005 | Landes et al. | 701/102 |
| 7,479,707 B2 | 1/2009 | Sulzer | |
| 7,668,642 B2* | 2/2010 | Fuwa et al. | 701/112 |
| 8,103,431 B2 | 1/2012 | Lancaster et al. | |
| 8,335,631 B2 | 12/2012 | Chen | |
| 2003/0033068 A1* | 2/2003 | Kawai et al. | 701/54 |
| 2005/0193997 A1* | 9/2005 | Cullen | F02D 41/0087 123/698 |
| 2007/0080537 A1* | 4/2007 | Albertson | F02D 41/3029 290/40 B |
| 2007/0233332 A1* | 10/2007 | Kawada | B60K 6/365 701/13 |
| 2009/0050107 A1* | 2/2009 | Fuwa et al. | 123/339.1 |
| 2009/0187328 A1* | 7/2009 | Lancaster et al. | 701/103 |
| 2011/0226217 A1* | 9/2011 | Raasch | 123/376 |
| 2012/0184405 A1* | 7/2012 | Morimura | B60W 10/06 477/54 |
| 2012/0271525 A1 | 10/2012 | Bucci et al. | |

* cited by examiner

*Primary Examiner* — Hung Q Nguyen
*Assistant Examiner* — Brian P Monahon
(74) *Attorney, Agent, or Firm* — Julia Voutyras; Alleman Hall McCoy Russell & Tuttle LLP

(57) ABSTRACT

A method and system for improving vacuum generation for a vehicle is described. In one example, engine speed and alternator load are adjusted in an alternating manner to increase and amount of vacuum provide by an engine to a vacuum reservoir.

16 Claims, 6 Drawing Sheets

METHOD AND SYSTEM FOR PROVIDING VACUUM FOR A VEHICLE

FIELD

The present description relates to a method and system for providing vacuum for a vehicle. The method and system may be particularly useful for vehicles that include small displacement engines.

BACKGROUND AND SUMMARY

Vacuum may be used as a device actuating medium in a vehicle. For example, vacuum may be used to assist a driver applying vehicle brakes. In particular, vacuum operates on a brake booster diaphragm to increase an amount of force applied to vehicle brakes when a driver depresses a brake pedal. However, if the vehicle includes a smaller displacement engine, it may be difficult for the engine to provide as much vacuum as is desired via its intake manifold or an ejector. One way of improving an amount of vacuum generated by an engine is to reduce engine load so that less air is necessary to keep the engine running. However, it may not always be possible to reduce engine load when additional vacuum is desired. Further, even if some loads can be shed from the engine so that the engine may provide additional vacuum, shedding the loads may reduce engine efficiency, vehicle drivability, and/or driver comfort.

The inventor herein has recognized the above-mentioned issues and have developed an engine method, comprising: during a first condition, reducing a first engine operating parameter and a second operating parameter in an alternating manner in response to a desired engine intake manifold vacuum; and during a second condition, reducing the first engine operating parameter followed by reducing the second engine operating parameter.

By adjusting an engine speed and load applied to an engine by an alternator or another engine speed dependent device in an alternating manner, it may be possible to improve vacuum generation via the engine. Further, engine output torque may be maintained at a level that provides improve vehicle drivability and driver comfort while vacuum is being produced by the engine. For example, load of a device coupled to the engine, such as an alternator, may be incrementally reduced to lower engine load. Between each incremental reduction in load applied to the engine, the engine speed may be adjusted to further reduce load provided to the engine by engine speed dependent devices. The adjustments to load applied to the engine and engine speed may be stopped when engine intake manifold vacuum reaches a threshold vacuum so that extra vacuum is not provided and so that the engine operates more efficiently. Further, the engine may continue to supply power to the load device to improve vehicle drivability and driver comfort while vacuum generation by the engine is increasing. In this way, engine efficiency may be improved while a desired amount of vacuum is provided by the engine.

The present description may provide several advantages. In particular, the approach may improve engine efficiency when the engine is providing vacuum. Further, the approach may account for different devices that have opposite engine speed dependent effects on load applied to the engine. Further still, the approach may improve vehicle drivability by allowing partial performance of some engine loads.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
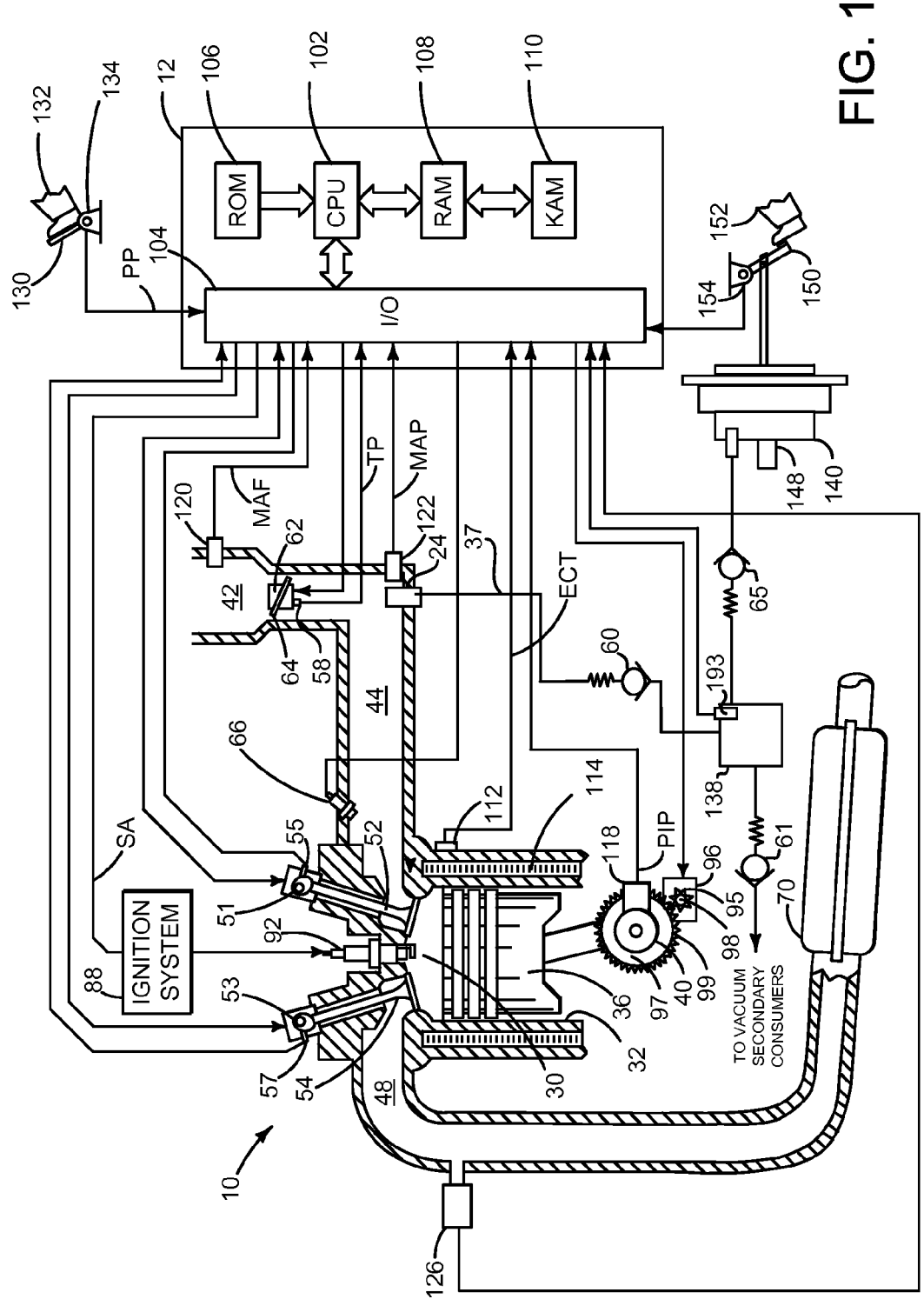
FIG. 1 is a schematic diagram of an engine.
Figure 2:
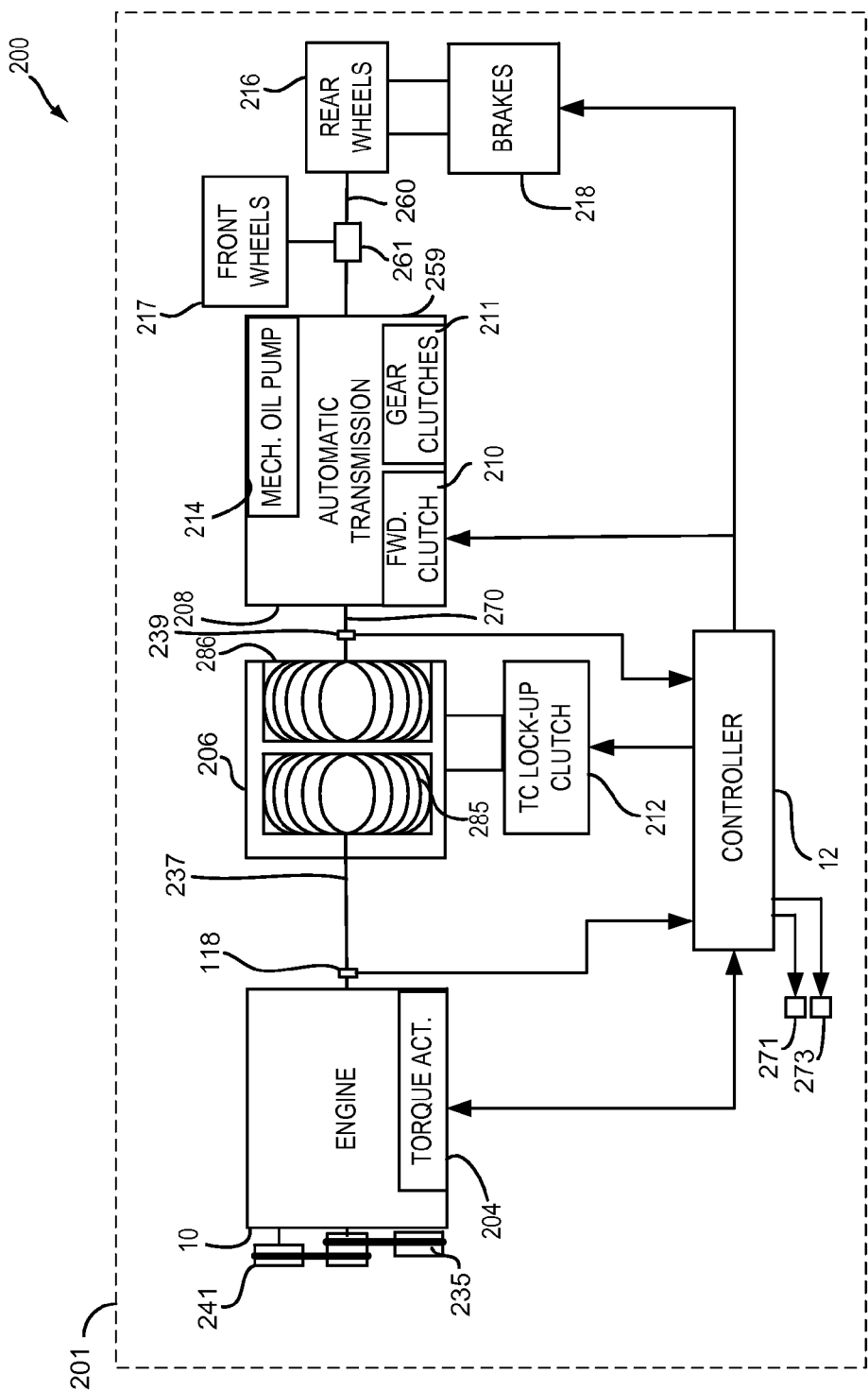
FIG. 2 shows an example vehicle and vehicle driveline configuration.
Figure 4:
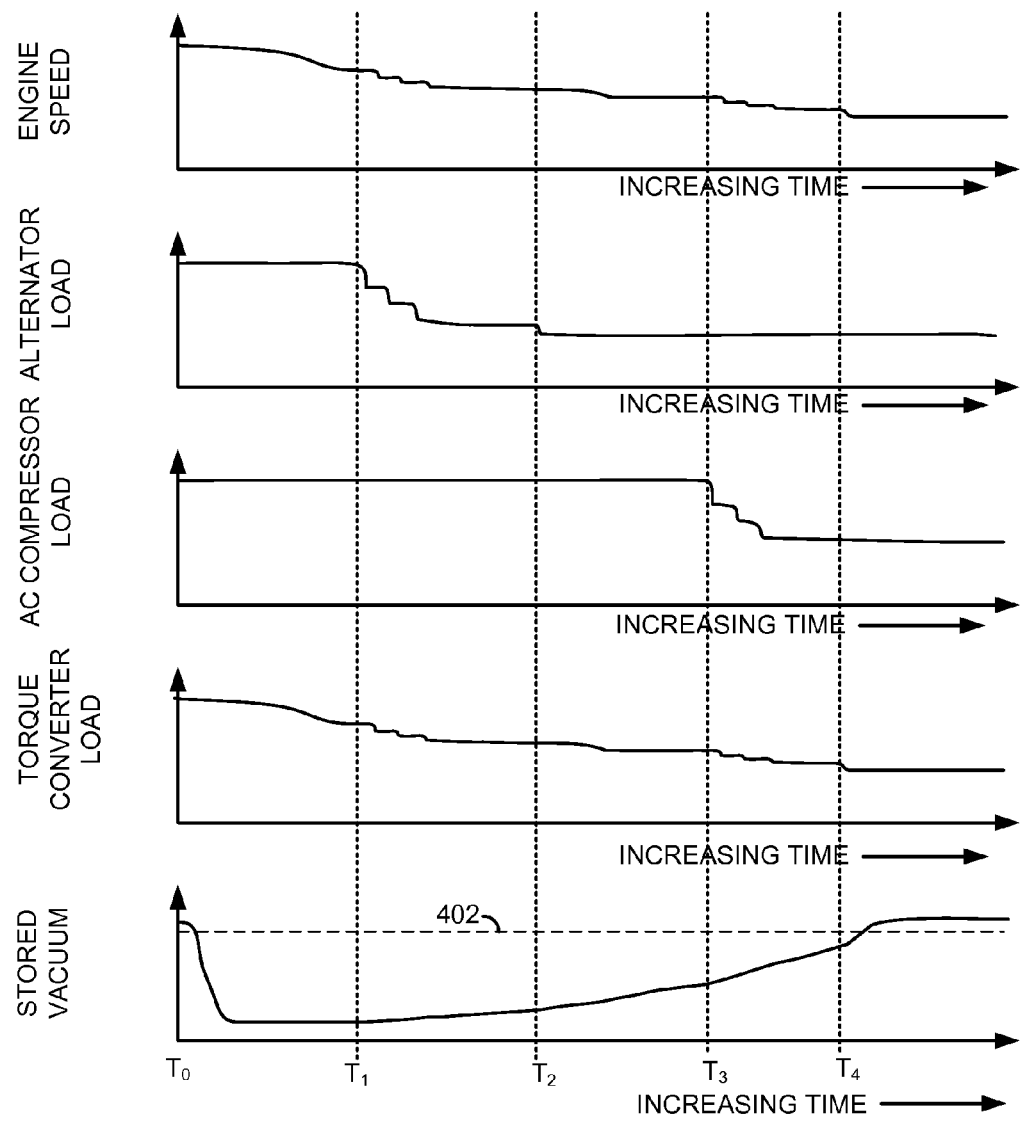
FIG. 4 shows an example engine vacuum generation sequence.

The present description is related to controlling a vehicle powertrain. The vehicle may include an engine and transmission as is shown in FIGS. 1-2. The engine may include engine speed dependent devices that apply load to the engine and provide ancillary functions. Loads applied to the engine via the engine speed dependent devices and engine speed and may be controlled as shown in FIG. 4 according to the method illustrated in the flowchart of FIGS. 5 and 6.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter motor 96 may selectively supply torque to crankshaft 40 via a belt or chain. In one example, starter 96 is in a base state when not engaged to the engine crankshaft.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel into an intake port of cylinder 30, which is known to those skilled in the art as port fuel injection. Alternatively, fuel may be injected directly into a cylinder, which is known to those skilled in the art as direct injection. Fuel injector 66 delivers liquid fuel in proportion to a pulse width from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Vacuum is supplied to vehicle systems via vacuum port 24. The intake manifold vacuum draws air from vacuum reservoir 138 via vacuum passage 37 and check valve 60 when intake manifold pressure is less than pressure in vacuum reservoir 138. Alternatively, vacuum port 24 may be an ejector powered by compressed air from a turbocharger (not shown). Check valve 60 allows flow when the pressure within vacuum passage 37 is lower than the pressure within vacuum reservoir 138. In some examples, vacuum reservoir 138 may be referred to as a vacuum system reservoir since it can supply vacuum throughout the vacuum system and since brake booster 140 may contain a vacuum reservoir too. Pressure in reservoir 138 may be monitored via vacuum reservoir pressure sensor 193. Vacuum system reservoir 138 provides vacuum to brake booster 140 via check valve 65. Check valve 65 allows air to enter vacuum system reservoir 138 from brake booster 140 and substantially prevents air from entering brake booster 140 from vacuum system reservoir 138. Vacuum system reservoir 138 may also provide vacuum to other vacuum consumers such as turbocharger waste gate actuators, heating and ventilation actuators, driveline actuators (e.g., four wheel drive actuators), fuel vapor purging systems, engine crankcase ventilation, and fuel system leak testing systems. Check valve 61 allows air flow from secondary vacuum consumers (e.g., vacuum consumers other than the vehicle braking system) to vacuum system reservoir 138. Brake booster 140 may include an internal vacuum reservoir, and it may amplify force provided by foot 152 via brake pedal 150 to master cylinder 148 for applying vehicle brakes (not shown). Other vacuum generators may be connected to reservoir 138.

Vehicle wheel brakes may be provided when brake pedal 150 is applied via foot 152. Brake pedal sensor 154 supplies a signal indicative of brake pedal position to controller 12. Foot 152 is assisted by brake booster 140 applying vehicle brakes.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. Engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 201 and vehicle driveline 200. Driveline 200 may be powered by engine 10. Engine 10 may be started with the starter motor shown in FIG. 1. Further, engine 10 may generate or adjust torque via torque actuator 204, such as a fuel injector, throttle, etc.

Engine 10 may provide torque to engine torque loads that include air conditioner compressor 235 and alternator 241. Air conditioner compressor 235 compresses gas to provide cooling for a cabin of vehicle 201. Alternator 241 supplies electrical power to charge a vehicle battery and operate the vehicle's electrical components.

An engine output torque may be transmitted to an input side of impeller 285 of torque converter 206 via shaft 237. Torque converter 206 includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 118 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the transmission torque converter lockup clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to rear wheels 216 to propel the vehicle via output shaft 260. Specifically, automatic transmission 208 may transfer an input driving torque at the input shaft 270 responsive to a vehicle traveling condition before transmitting an output driving torque to the rear wheels 216. Torque may also be directed to front wheels 217 via transfer case 261. By engaging more than one gear, the transmission can absorb instead of transmit torque which can be useful during some conditions.

Further, a frictional force may be applied to wheels 216 by engaging wheel brakes 218. In one example, wheel brakes 218 may be engaged in response to the driver pressing his foot on a brake pedal (150 in FIG. 1). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine, for example. Thus, the hydraulic pressure generated in mechanical oil pump 214 may increase as an engine speed increases, and may decrease as an engine speed decreases. This is sometimes pressure-regulated and increasing the pressure above what is needed to prevent unintended transmission slip increases the torque consumed by the transmission (thus not transmitted to the driving wheels). This can be a useful feature during some conditions.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. Engine control may be performed on a cylinder-by-cylinder basis to control the engine torque output. Controller 12 may also selectively activate and deactivate vehicle electrical loads 271 and 273. Vehicle electrical loads may include but are not limited to defrosters, seat heaters, fans, and motors.

When idle-stop conditions are satisfied, controller 42 may initiate engine shutdown by shutting off fuel and spark to the engine. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate the engine by resuming combustion in engine cylinders.

Thus, the system of FIGS. 1 and 2 provides for an engine system, comprising: an engine including an intake manifold; an alternator mechanically coupled to the engine; a torque converter mechanically coupled to the engine; and a controller including executable instructions stored in non-transitory memory for alternating between adjusting a speed of the engine and reducing load on the alternator in response to a vacuum request. The engine system further comprises additional instructions to gradually reduce a load of an air conditioner in response to the vacuum request.

In some examples, the engine system further comprises additional instructions to adjust engine speed to reduce torque applied to the engine via the alternator and the torque converter. The engine system further comprises additional instructions to reduce torque applied to the engine via the alternator and the torque converter via adjusting engine speed. The engine system further comprises stopping alternating between adjusting a speed of the engine and reducing load on the alternator in response to a vacuum exceeding a threshold vacuum.

Figure 3:
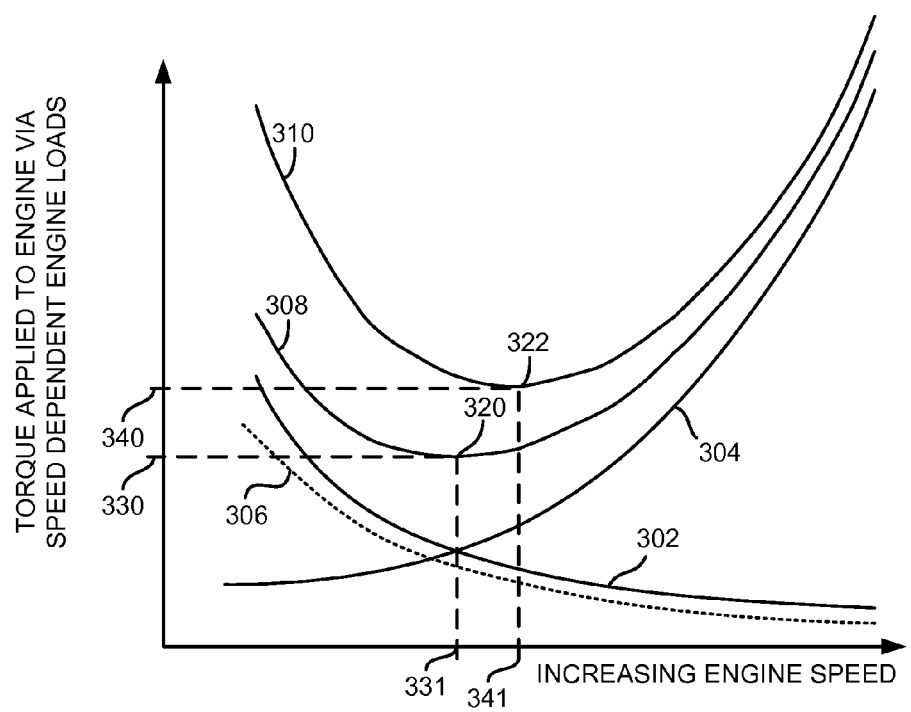
FIG. 3 shows an example plot of different engine speed dependent engine load characterizations.

Referring now to FIG. 3, an example plot of different engine speed dependent engine load characterizations is shown. The Y axis represents torque applied to an engine by the engine speed dependent loads. The X axis represents engine speed as input to the engine speed dependent loads.

In an idealized sense, curves 302 and 303 may be hyperbolas (constant power). (speed×torque=power). In an idealized sense, curve 304 may be a parabola, representing a fluid coupling and like rotating fluid machines. (torque=K*speed^2).

Curve 304 represents an engine load characterization of a torque converter for a stopped vehicle. For a vehicle in motion, the torque converter curve is similar but the X axis is engine speed minus turbine speed. The engine load characterization shows that torque converter torque load applied to the engine increases proportionally with the square of engine speed. Curve 302 represents an engine load characterization of an alternator supplying a constant amount of power to one or more electrical loads. The engine load characterization shows that alternator torque load applied to the engine decreases as engine speed increases since power is torque multiplied by speed. Curve 306 represents an engine load characterization of an air conditioner compressor supplying a constant amount of power to compress a refrigerant in an air conditioning system. The engine load characterization shows that air conditioner torque load applied to the engine decreases as engine speed increases since power is torque multiplied by speed.

If the vehicle system includes only an alternator and a torque converter, or if the air conditioner compressor is off, curve 302 and curve 304 sum to curve 308. The minimum of curve 308 occurs at 320 which represents a minimum load applied to the engine via the torque converter and the alternator when the torque converter and alternator are operating. If engine speed increases or decreases from the engine speed at 320, the amount of torque applied to the engine will increase. And, if engine speed is controlled to the engine speed at 320, torque applied to the engine via the torque converter and the alternator is minimized. By minimizing torque applied to the engine, the engine may be operated with a smaller air amount to provide a desired engine speed. Operating the engine with a smaller air amount allows the engine to produce additional vacuum. The torque applied to the engine at 320 may be found via extending a line to the Y axis from 320 yielding the torque value 330. The engine speed at 320 may be found via extending a line to the X axis from 320 yielding the engine speed at 331. Computationally, the minimum 320 may be found via finding where the derivative of curve 308 is zero.

If the alternator is operating along with the air conditioner compressor and the torque converter, torque applied to the engine is represented by curve 310 which is the sum of curves 302, 306, and 304. The minimum engine torque when the three speed dependent loads are applied to the engine is at 322. The location of minimum torque for curve 310 may be determined via finding where the derivative of curve 310 is equal to zero. Thus, the sum of curves 302, 304, and 306 may be the basis for determining the engine speed where torque applied to the engine is a minimum when the alternator, torque converter, and air conditioner compressor are operating. The engine speed that provides the minimum engine torque is found by extending a line from location 322 to the X axis. The engine torque at location 322 is found by extending a line from 322 to the Y axis. Computationally, engine speed and engine torque at 322 may be determined by solving where the derivative of curve 310 equals zero, solving the equation of curve 310 for X in terms of Y, and substituting the value of X in terms of Y into the equation for curve 322. Additionally, functions or tables representing curves 302, 304, and 306 as well as additional curves representing different constant power levels may be the basis for determining a desired engine speed that results in a lowest engine torque at the engine load applied by the torque converter, the alternator, and the air conditioning compressor.

It should be mentioned that in some examples, additional speed dependent engine loads such as coolant pump, oil pump, transmission pump, alternator, AC compressor, torque converter, and lumped engine friction may also be characterized as curves and/or functions that are added together depending on engine operating conditions. The method is the same as additional engine loads are considered. For example, the summed engine torque is computed, the engine speed that minimizes applied engine torque is determined, and intake manifold vacuum for the conditions is maximized.

If the front end accessory drive (FEAD) loads are off, the minimum engine torque tends to drive engine speed to minimum idle speed as the torque converter load tends to dominate load applied to the engine. If the FEAD loads are on and the transmission is in neutral (such that torque converter load is zero), such conditions tend to drive the engine speed to maximum idle speed to maximize engine vacuum production.

Referring now to FIG. 4, an example engine vacuum generating sequence is shown. The sequence of FIG. 4 may be provided by the method of FIGS. 5 and 6 in a system as shown in FIGS. 1 and 2. Vertical markers $T_0$-$T_4$ represent times of interest during the sequence.

The first plot from the top of FIG. 4 represents engine speed versus time. The Y axis represents engine speed and engine speed increases in the direction of the Y axis arrow. The X axis represents time and time increases from left to right.

The second plot from the top of FIG. 4 represents alternator load applied to an engine versus time. The Y axis represents alternator load applied to an engine and alternator load increases in the direction of the Y axis arrow. The X axis represents time and time increases from left to right.

The third plot from the top of FIG. 4 represents air compressor load applied to an engine versus time. The Y axis represents air compressor load and air compressor load increases in the direction of the Y axis arrow. The X axis represents time and time increases from left to right.

The fourth plot from the top of FIG. 4 represents torque converter load applied to an engine versus time. The Y axis represents torque converter load applied to an engine and torque converter load applied to an engine increases in the direction of the Y axis arrow. The X axis represents time and time increases from left to right.

The fifth plot from the top of FIG. 4 represents an amount of vacuum stored in a vacuum reservoir versus time. The Y axis represents an amount of vacuum stored in a vacuum reservoir and vacuum increases in the direction of the Y axis arrow. The X axis represents time and time increases from left to right. Horizontal line 402 represents a desired amount of vacuum in the vacuum reservoir. If vacuum stored in the vacuum reservoir is less than the level of 402, control actions may be taken to increase the amount of vacuum generated by an engine.

At time $T_0$, engine speed is begins decreasing and the amount of stored vacuum begins decreasing in response to use of a vehicle brake pedal (not shown). The alternator load applied to the engine is at a higher level as is the air conditioner load that is applied to the engine. The torque converter load is also at a higher level since engine speed is at a higher level. The conditions at time $T_0$ are indicative of conditions when a vehicle is decelerating while a vehicle brake is applied.

Between time $T_0$ and time $T_1$, the amount of stored vacuum decreases further and the alternator and air conditioner loads applied to the engine remain constant. The torque converter load applied to the engine decreases as engine speed decreases. The engine speed is reduced in response to a lower desired engine speed which is responsive to a low desired engine torque provided by a driver (not shown).

At time $T_1$, a control action is taken in response to stored vacuum being less than level 402. The control action is taken to increase vacuum produced by the engine. In particular, an electrical load applied to the alternator is shed (e.g., removed) lowering the load that the alternator applies to the engine. By lowering the load applied to the engine, it may be possible for the engine to produce additional vacuum. The air conditioner compressor load remains at a higher level and the amount of stored vacuum levels out at a lower value.

Between time $T_1$ and time $T_2$, alternator load and engine speed are adjusted in an alternating manner such that alternator load is decreased followed by adjusting engine speed being decreased. It should be noted that engine speed may be adjusted before alternator load. In this particular example, alternator load applied to the engine is reduced three times after time $T_1$. Engine speed is also adjusted three times. Engine speed is adjusted to an engine speed where engine load characterizations representing the torque converter, alternator, and air conditioner compressor indicate torque applied to the engine is lowest. For example, as shown by the curves in FIG. 3 at 320, a desired engine speed may be determined from a minimum of the sum of applied engine load curves or characterizations. The intersection represents a minimum load that is applied to the engine by the speed dependent engine loads. The amount of stored vacuum begins to increase as the load applied to the engine and engine speed is adjusted. The torque converter load is reduced as engine speed is reduced. It should be noted that engine speed may be increased in some examples depending on speed dependent loads.

At time $T_2$, alternator voltage output is reduced to further reduce the load that the alternator applies to the engine. The engine speed is adjusted responsive to the engine speed dependent characteristics of the alternator, torque converter, and air conditioner compressor to reduce torque that is applied to the engine.

At time $T_3$, another control action is taken in response to stored vacuum being less than level 402. Specifically, an air conditioner load is shed (e.g., removed) via reducing the displacement of a variable displacement compressor. The alternator load remains at a lower level and the amount of stored vacuum continues to increase but it is well below level 402.

Between time $T_3$ and time $T_4$, air conditioner load applied to the engine and engine speed are adjusted in an alternating manner such that air conditioner load is decreased followed by adjusting engine speed being decreased. It should be noted that engine speed may be adjusted before air conditioner load. In this example, air conditioner load applied to the engine is reduced three times after time $T_3$. Engine speed is also adjusted three times. Engine speed is adjusted to an engine speed where engine load characterizations representing the torque converter, alternator, and air conditioner compressor indicate torque applied to the engine is lowest. The amount of stored vacuum continues to increase as the load applied to the engine and engine speed are adjusted. The torque converter load is reduced as engine speed is reduced.

At time $T_4$, engine speed is further reduced to reduce the torque applied to the engine via the torque converter since the stored amount of vacuum is still less than level 402. In one example, the engine speed may be reduced to a base idle speed (e.g., an idle speed corresponding to a warm engine without adding any additional speed to elevate engine idle speed). The amount of stored vacuum continues to increase as the engine's capacity to generate vacuum increases. The amount of stored vacuum reaches level 402 shortly after time $T_4$.

In this way, the amount of vacuum generated by an engine and supplied to a vacuum reservoir may be increased. Further, if the desired vacuum level is reached before engine torque is reduced to a low level, the engine may continue to supply torque to loads that are coupled to the engine so as to improve driver comfort and vehicle drivability.

Figure 5:
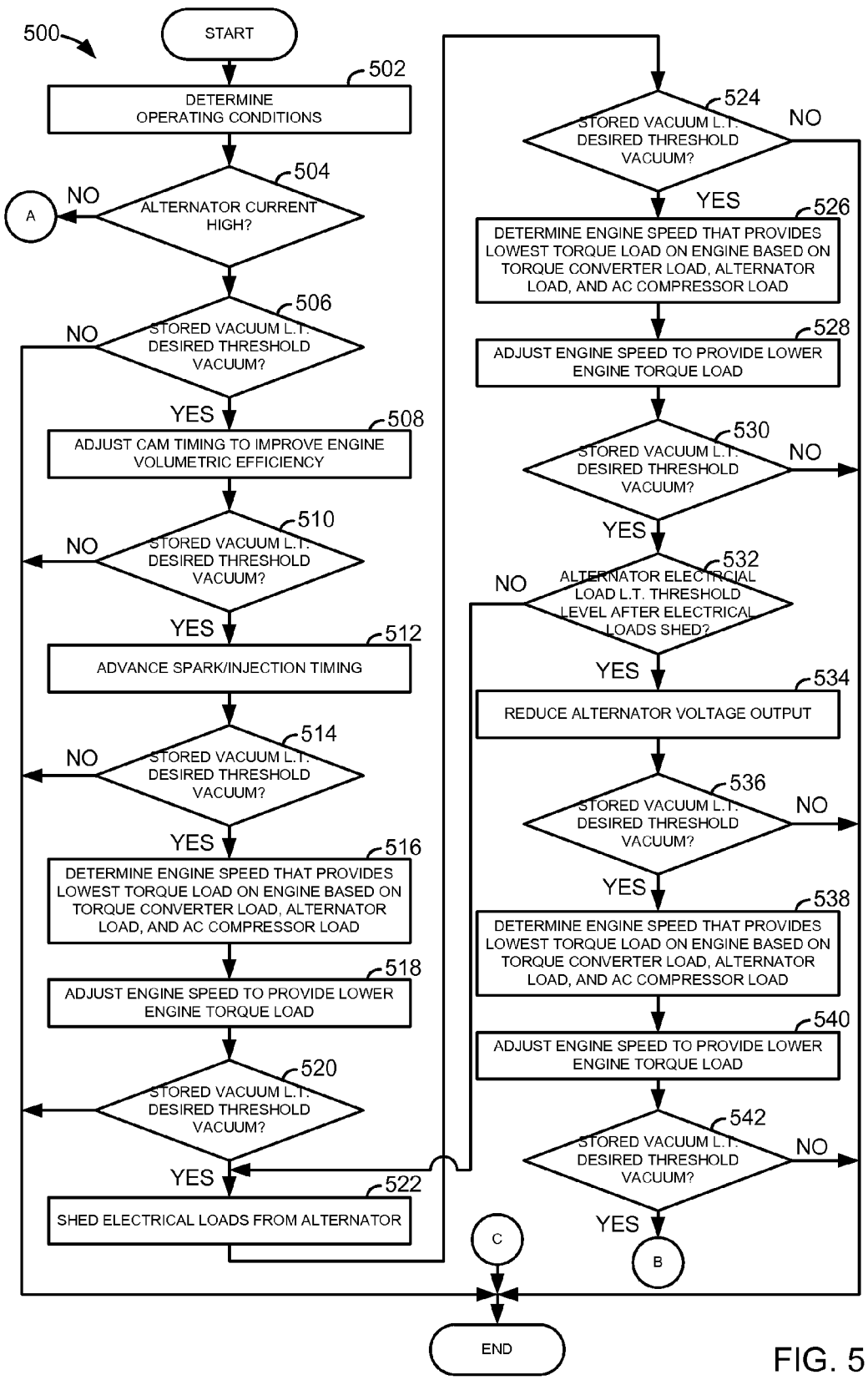
FIGS. 5 and 6 show an example method for operating an engine.
Figure 6:
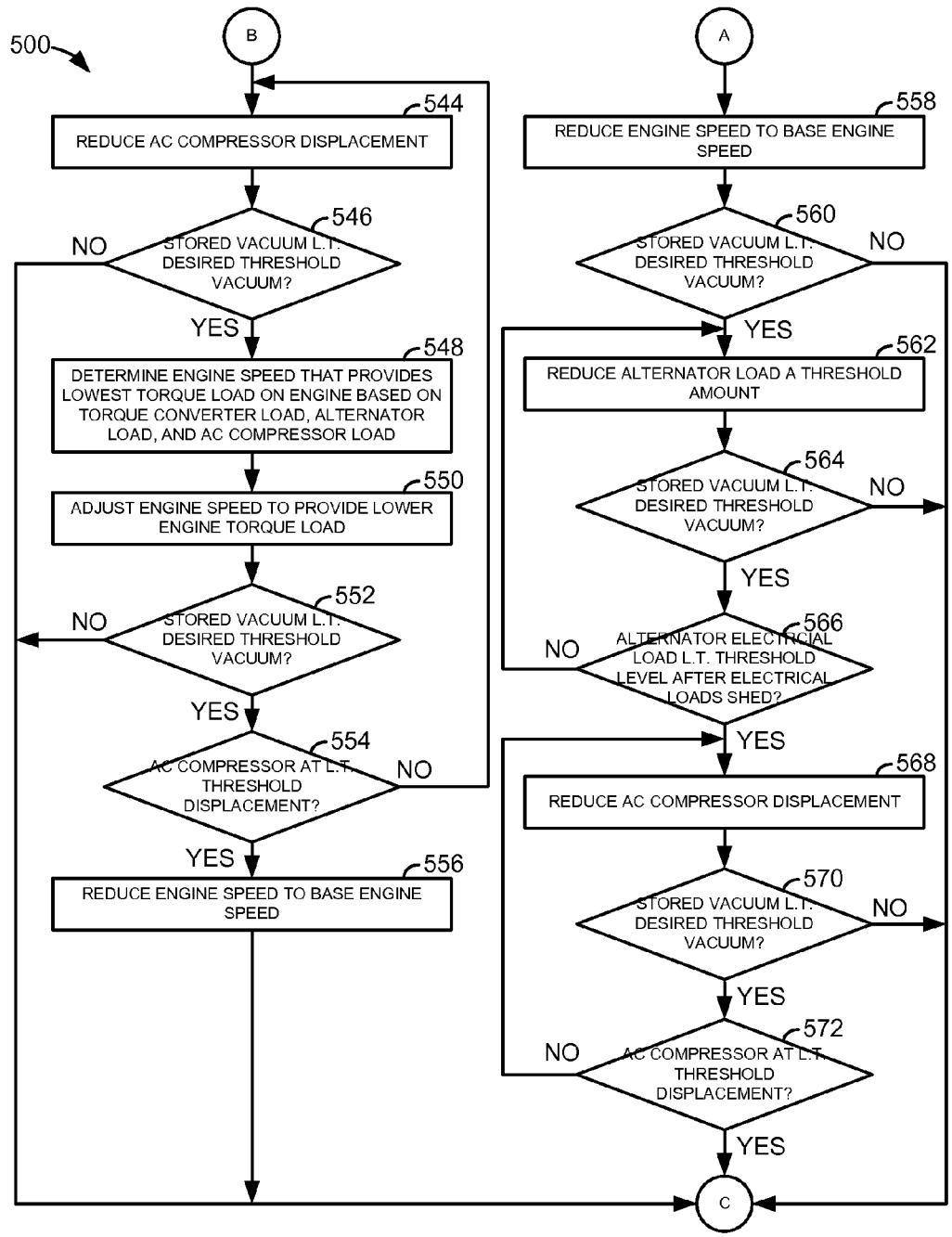

Referring now to FIGS. 5 and 6, a method for operating an engine to selectively improve vacuum production is shown. The method of FIGS. 5 and 6 may be stored as executable instructions in non-transitory memory of controller 12 shown in the system of FIGS. 1 and 2. Further, the method of FIGS. 5 and 6 may provide the engine operating sequence shown in FIG. 4.

At 502, method 500 determines operating conditions. Operating conditions may include but are not limited to engine speed, vacuum level stored in a vacuum reservoir, alternator current or load, air conditioner load, vehicle speed, vehicle brake state, and engine load. Method 500 proceeds to 504 after operating conditions are determined.

At 504, method 500 judges whether or not alternator current is at a higher level. In one example, alternator current or load may be judged to be at a higher level when alternator current or load is greater than a threshold level. If method 500 judges that alternator current or load is higher than a threshold level, method 500 proceeds to 506. Otherwise, method 500 proceeds to 558 of FIG. 6.

At 558, method 500 reduces engine speed toward a base engine speed. In some examples, engine speed may be reduced to base engine speed. By reducing engine speed to base engine speed, the load a torque converter applies to an engine may be reduced. Since alternator load is already at a lower level, a larger reduction in engine load may be achieved by the torque converter via reducing engine speed to base engine speed (e.g., a lowest engine idle speed used when the engine is warm and not speed adders are applied to elevate engine speed). Method 500 proceeds to 560 after engine speed is reduced to base idle speed.

At 560, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. In one example, a vacuum level or stored amount is determined via reading output of a vacuum or pressure sensor that is in communication with a vacuum reservoir. The vacuum level is then compared to a desired vacuum level. If the stored vacuum level is less than the desired vacuum level, the answer is yes and method 500 proceeds to 562. Otherwise, the answer is no and method 500 proceeds to exit.

At 562, method 500 reduces the load an alternator applies to an engine via selectively deactivating vehicle electrical loads. In one example, vehicle electrical loads that are likely to be less noticeable when deactivated are deactivated. Alternatively, current supplied to the electrical loads may be reduced via a field effect transistor or other device. In one example, a single electrical device may be deactivated or receive a reduced amount of current while other electrical devices remain at their present power usage level. Method 500 proceeds to 564 after power supplied to one or more electrical devices is reduced.

At 564, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 566. Otherwise, the answer is no and method 500 proceeds to exit.

At 566, method 500 judges whether or not all electrical loads available to be shed from the alternator have been shed to less than a threshold level. In one example, the shed electrical loads are compared to a threshold amount of electrical loads that may be shed. If the alternator electrical load is less than a threshold level after electrical loads have been shed from the alternator, the answer is yes and method 500 proceeds to 568. Otherwise, the answer is no and method 500 returns to 562.

At 568, method 500 reduces the load an air conditioner compressor applies to an engine via reducing compressor displacement. In one example, air conditioner compressor displacement is reduced via changing a position of a swash plate in the air conditioner compressor. Method 500 proceeds to 570 after air compressor displacement is reduced.

At 570, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 572. Otherwise, the answer is no and method 500 proceeds to exit.

At 572, method 500 judges whether or not air conditioner compressor displacement is less than a desired air conditioner compressor displacement. If the air conditioner compressor displacement is less than the threshold air conditioner compressor displacement, the answer is yes and method 500 proceeds to exit. Otherwise, the answer is no and method 500 returns to 568.

At 506, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 508. Otherwise, the answer is no and method 500 proceeds to exit.

At 508, method 500 adjusts intake and/or exhaust valve timing to improve engine volumetric efficiency. In one example, the intake cam is advanced to improve engine volumetric efficiency. By improving engine volumetric efficiency, additional air may be drawn from the engine's intake manifold to increase the engine's vacuum production. Method 500 proceeds to 510 after cam timing adjustments are performed.

At 510, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 512. Otherwise, the answer is no and method 500 proceeds to exit.

At 512, method 500 adjusts spark timing and/or injection timing to advance combustion timing toward minimum spark or fuel timing for best torque (MBT). By increasing engine torque output via spark or start of injection timing, it may be possible to reduce the engine air amount so that the intake throttle can be closed to increase vacuum produced by the engine. Method 500 proceeds to 514 after spark and/or fuel injection timing adjustments are performed.

At 514, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 516. Otherwise, the answer is no and method 500 proceeds to exit.

At 516, method 500 determines an engine speed that provides a lowest torque load on an engine based on loads coupled to the engine. Loads coupled to the engine may include engine speed dependent loads such as the torque converter, the alternator, and an air conditioner compressor. In one example, a desired engine speed is determined from engine load characterizations (e.g., curves or functions stored in controller memory that represent load applied to the engine from devices such as alternators, torque converters, and air conditioning compressors). Specifically, engine load characterizations representing the present state of engine load devices are loaded into memory and summed to provide a curve that represents all loads presently applied to the engine. A minimum of the curve provided by summing individual engine loads is determined via finding where a derivative of the curve is zero and a minimum torque level. The engine speed and torque applied to the engine are found by solving for X (e.g., engine speed) and Y (e.g., engine torque) where the summed curves have a minimum torque value.

For example, as described with regard to FIG. 3, the engine speed is adjusted to the engine speed that corresponds to 320. In one example where the torque converter engine load characterization is represented as a function of engine speed and engine load torque, and where the alternator load characterization is represented as a function of engine speed and engine load torque, the sum of torque converter torque applied to the engine and alternator torque applied to the engine is represented by curve 308. The minimum 320 may be determined by finding where the derivative of curve 308 is zero and a minimum engine torque. Engine speed is determined via solving the equation of curve 308 (e.g., the sum of alternator and torque converter curves) for Y in terms of X and substituting the solution of Y into the equation representing curve 308 where the derivative is zero. The reduced engine torque is provided by adjusting engine speed to be substantially (e.g. ±50 RPM) an engine speed where minimum torque is applied to the engine via the curve 308 representing the sum of the torque converter torque characterization and alternator torque characterization. Method 500 proceeds to 518 after the minimum of summed torque characterizations applied to the engine is determined.

It should be noted that many curves or functions or tables may be used to describe the load the alternator and/or air conditioner compressor apply to the engine over the range of vehicle operating conditions. Operating conditions between specific curves or functions may be interpolated.

At 518, method 500 adjusts desired engine speed to the engine speed determined at 516 so that engine torque is reduced. The engine speed may be adjusted via adjusting engine air amount, spark timing, and/or fuel amount. In this way, engine speed may be adjusted to substantially minimize engine torque (e.g., reduce engine torque to within 5% of minimum engine torque to operate the engine and engine speed dependent loads that are coupled to the engine) to operate engine speed dependent engine loads. Method 500 proceeds to 520 after engine speed is adjusted.

At 520, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 522. Otherwise, the answer is no and method 500 proceeds to exit.

At 522, method 500 sheds electrical loads applied to the alternator and engine load via selectively deactivating vehicle electrical loads. In one example, vehicle electrical loads that are likely to be less noticeable when deactivated are deactivated. Alternatively, current supplied to the electrical loads may be reduced via a field effect transistor or other device. In one example, a single electrical device may be deactivated or receive a reduced amount of current while other electrical devices remain at their present power usage level. Method 500 proceeds to 524 after power supplied to one or more electrical devices is reduced.

At 524, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 526. Otherwise, the answer is no and method 500 proceeds to exit.

At 526, method 500 determines an engine speed that provides a low engine torque load on the engine based on engine speed dependent loads such as a torque converter, alternator, and air conditioner compressor as described at 516. Since operating conditions change after adjusting alternator load, a new engine speed is determined based on the newly reduced alternator load. Method 500 proceeds to 528 after the desired engine speed is revised.

At 528, method 500 adjusts engine speed to the desired engine speed. Engine speed may be adjusted to the desired engine speed via adjusting engine torque. Engine torque may be adjusted via spark timing, engine air amount, and engine fuel amount. Specifically, if a higher engine speed is desired, engine torque output is increased. If a lower engine speed is desired, engine torque output is decreased. Method 500 proceeds to 530 after engine speed is adjusted to the desired engine speed.

At 530, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 532. Otherwise, the answer is no and method 500 proceeds to exit.

At 532, method 500 judges whether or not all electrical loads available to be shed from the alternator have been shed to less than a threshold level. In one example, the shed electrical loads are compared to a threshold amount of electrical loads that may be shed. If the alternator electrical load is less than a threshold level after electrical loads have been shed from the alternator, the answer is yes and method 500 proceeds to 534. Otherwise, the answer is no and method 500 returns to 522.

At 534, method 500 reduces the voltage output from the alternator. By reducing the alternator voltage output, the alternator load applied to the engine may be reduced. In one example, the alternator voltage output is reduced by adjusting alternator field current. Method 500 proceeds to 536 after alternator voltage output is adjusted.

At 536, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 538. Otherwise, the answer is no and method 500 proceeds to exit.

At 538, method 500 determines an engine speed that provides a low engine torque load on the engine based on engine speed dependent loads such as a torque converter, alternator, and air conditioner compressor as described at 516. Since operating conditions change after adjusting alternator load, a new engine speed is determined based on the newly reduced alternator load. Method 500 proceeds to 540 after the desired engine speed is revised.

At 540, method 500 adjusts engine speed to the desired engine speed. Engine speed may be adjusted to the desired engine speed via adjusting engine torque. Engine torque may be adjusted via spark timing, engine air amount, and engine fuel amount. Specifically, if a higher engine speed is desired, engine torque output is increased. If a lower engine speed is desired, engine torque output is decreased. Method 500 proceeds to 542 after engine speed is adjusted to the desired engine speed.

At 542, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 544. Otherwise, the answer is no and method 500 proceeds to exit.

At 544, method 500 reduces air conditioner compressor displacement as described at 568. Method 500 proceeds to 546 after compressor displacement is reduced.

At 546, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 548. Otherwise, the answer is no and method 500 proceeds to exit.

At 548, method 500 determines an engine speed that provides a low engine torque load on the engine based on engine speed dependent loads such as a torque converter, alternator, and air conditioner compressor as described at 516. Since operating conditions change after adjusting alternator load, a new engine speed is determined based on the newly reduced alternator load. Method 500 proceeds to 550 after the desired engine speed is revised.

At 550, method 500 adjusts engine speed to the desired engine speed. Engine speed may be adjusted to the desired engine speed via adjusting engine torque. Engine torque may be adjusted via spark timing, engine air amount, and engine fuel amount. Specifically, if a higher engine speed is desired, engine torque output is increased. If a lower engine speed is desired, engine torque output is decreased. Method 500 proceeds to 542 after engine speed is adjusted to the desired engine speed.

At 552, method 500 judges whether or not vacuum stored in a vacuum reservoir is less than a desired threshold vacuum level or amount. Alternatively, method 500 may judge whether or not vacuum in an intake manifold of the engine is less than the desired threshold vacuum level or amount. The vacuum level is then compared to a desired vacuum level. If the stored vacuum level is less than the desired vacuum level, the answer is yes and method 500 proceeds to 554. Otherwise, the answer is no and method 500 proceeds to exit.

At 554, method 500 judges whether or not air conditioner compressor displacement is less than a desired air conditioner compressor displacement. If the air conditioner compressor displacement is less than the threshold air conditioner compressor displacement, the answer is yes and method 500 proceeds to exit. Otherwise, the answer is no and method 500 returns to 544. In some examples, the threshold air conditioner compressor displacement is a minimum air conditioner compressor displacement.

At 556, method 500 reduces engine speed toward a base engine speed. In some examples, engine speed may be reduced to base engine speed. By reducing engine speed to base engine speed, the load a torque converter applies to an engine may be reduced. Since alternator load is already at a lower level, a larger reduction in engine load may be achieved via reducing engine speed to base engine speed (e.g., a lowest engine idle speed used when the engine is warm and not speed adders are applied to elevate engine speed). Method 500 proceeds to exit after engine speed is reduced to base idle speed.

In this way, control actions may be taken to reduce load applied to an engine so that the engine may operate with a lower torque output so that the engine may produce additional vacuum for the vehicle. It should also be noted that although the control actions described in FIGS. 5 and 6 are shown being serially performed, in other examples the control actions may be performed in parallel and at the same time. For example, the load that the alternator applies to the engine may be reduced at the same time as the load the air conditioner compressor applies to the engine. Similarly, cam timing adjustments and spark timing adjustments may be made simultaneously and at the same time as engine speed dependent loads applied to the engine are reduced.

Thus, the method of FIGS. 5 and 6 provides for an engine method, comprising: during a first condition, reducing a first engine operating parameter and a second operating parameter in an alternating manner in response to a desired engine intake manifold vacuum; and during a second condition, reducing the first engine operating parameter followed by reducing the second engine operating parameter. The engine method includes where the first engine operating parameter is engine speed, and where the second engine operating parameter is alternator load.

In some examples, the engine method further comprises reducing a third engine operating parameter and the first engine operating parameter in an alternating manner after reducing the first engine operating parameter and the second engine operating parameter. The engine method includes where the third engine operating parameter is an air conditioner compressor load. The engine method further comprises during the first condition reducing engine speed to a speed that substantially minimizes load on an engine provided by a first device and a second device. The engine method includes where the first device is a torque converter, and where the second device is an alternator. The engine method includes where the first condition is a first alternator output current, and where the second condition is a second alternator current, the first alternator current greater than the second alternator current.

The method of FIGS. 5 and 6 also provides for an engine method, comprising: adjusting engine speed to a speed responsive to a relationship between at least two engine speed dependent engine load characterizations, the first engine speed dependent engine load characterization of the at least two engine load characterizations increasing engine load as engine speed increases, the second engine speed dependent engine load characterization of the at least two engine load characterization decreasing engine load as engine speed increases. The engine method includes where the first engine speed dependent engine load characterization and the second engine speed dependent engine load characterization are two functions describing applied engine load of devices coupled to an engine versus engine speed.

In some examples, the engine method also includes where the engine speed is substantially adjusted to an engine speed where the two functions provide a minimum torque applied to an engine. The engine method includes where one of the two functions describes constant alternator output power for varying engine speed. The engine method further comprises a third engine speed dependent engine load characterization, where the first engine speed dependent engine load characterization, the second engine speed dependent engine load characterization, and the third engine speed dependent engine load characterization are three functions describing engine load versus engine speed, and adjusting engine speed substantially where a sum the three functions provides a minimum applied engine torque. The engine method includes where the relationship is a substantially minimized load applied on an engine via two devices that operate according to the at least two engine speed dependent engine load characterizations. The engine method includes where the first of the two devices is a torque converter, and where the second of the two devices is an alternator. The engine method includes where the first of the two devices is a torque converter, and where the second of the two devices is an air conditioner compressor.

As will be appreciated by one of ordinary skill in the art, methods described in FIGS. 5 and 6 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:
1. An engine method, comprising:
   during a first condition, adjusting a first engine operating parameter and a second engine operating parameter in an alternating manner in response to a desired engine intake manifold vacuum; and
   during a second condition, reducing the first engine operating parameter followed by reducing the second engine operating parameter,
   where the first condition is a first alternator output current, and where the second condition is a second alternator output current, the first alternator current greater than the second alternator current.

2. The engine method of claim 1, where the first engine operating parameter is engine speed, and where the second engine operating parameter is alternator load.

3. The engine method of claim 2, further comprising during the first condition adjusting a third engine operating parameter and the first engine operating parameter in an alternating manner after reducing the first engine operating parameter and the second engine operating parameter.

4. The engine method of claim 3, where the third engine operating parameter is an air conditioner compressor load.

5. The engine method of claim 1, further comprising during the first condition reducing engine speed to a speed that substantially minimizes load on an engine provided by a first device and a second device.

6. The engine method of claim 5, where the first device is a torque converter, and where the second device is an alternator.

7. An engine method, comprising:
adjusting engine speed to a speed responsive to a relationship between at least two engine speed dependent engine load characterizations, the first engine speed dependent engine load characterization of the at least two engine load characterizations increasing engine load as engine speed increases, the second engine speed dependent engine load characterization of the at least two engine load characterizations decreasing engine load as engine speed increases,
where the first engine speed dependent engine load characterization and the second engine speed dependent engine load characterization are two functions describing applied engine load of devices coupled to an engine versus engine speed,
where one of the two functions describes constant alternator output power for varying engine speed, and
where the engine speed is adjusted to an engine speed where a sum of the two functions is a minimum torque applied to an engine.

8. The engine method of claim 7, further comprising a third engine speed dependent engine load characterization, where the first engine speed dependent engine load characterization, the second engine speed dependent engine load characterization, and the third engine speed dependent engine load characterization are three functions describing engine load versus engine speed, and adjusting engine speed substantially to an engine speed where the three functions are a minimum applied engine torque.

9. The engine method of claim 7, where the relationship is a substantially minimized load applied on the engine via two devices that operate according to the at least two engine speed dependent engine load characterizations.

10. The engine method of claim 9, where a first of the two devices is a torque converter, and where a second of the two devices is an alternator.

11. The engine method of claim 9, where a first of the two devices is a torque converter, and where a second of the two devices is an air conditioner compressor.

12. An engine system, comprising:
an engine including an intake manifold;
an alternator mechanically coupled to the engine;
a torque converter mechanically coupled to the engine; and
a controller including executable instructions stored in non-transitory memory for alternating between adjusting a speed of the engine and reducing load on the alternator in response to a vacuum request.

13. The engine system of claim 12, further comprising additional instructions to gradually reduce a load of an air conditioner in response to the vacuum request.

14. The engine system of claim 12, further comprising additional instructions to adjust engine speed to reduce torque applied to the engine via the alternator and the torque converter.

15. The engine system of claim 12, further comprising additional instructions to reduce torque applied to the engine via the alternator and the torque converter via adjusting engine speed.

16. The engine system of claim 15, further comprising stopping alternating between adjusting the speed of the engine and reducing load on the alternator in response to a vacuum exceeding a threshold vacuum.

* * * * *